UNITED STATES PATENT OFFICE.

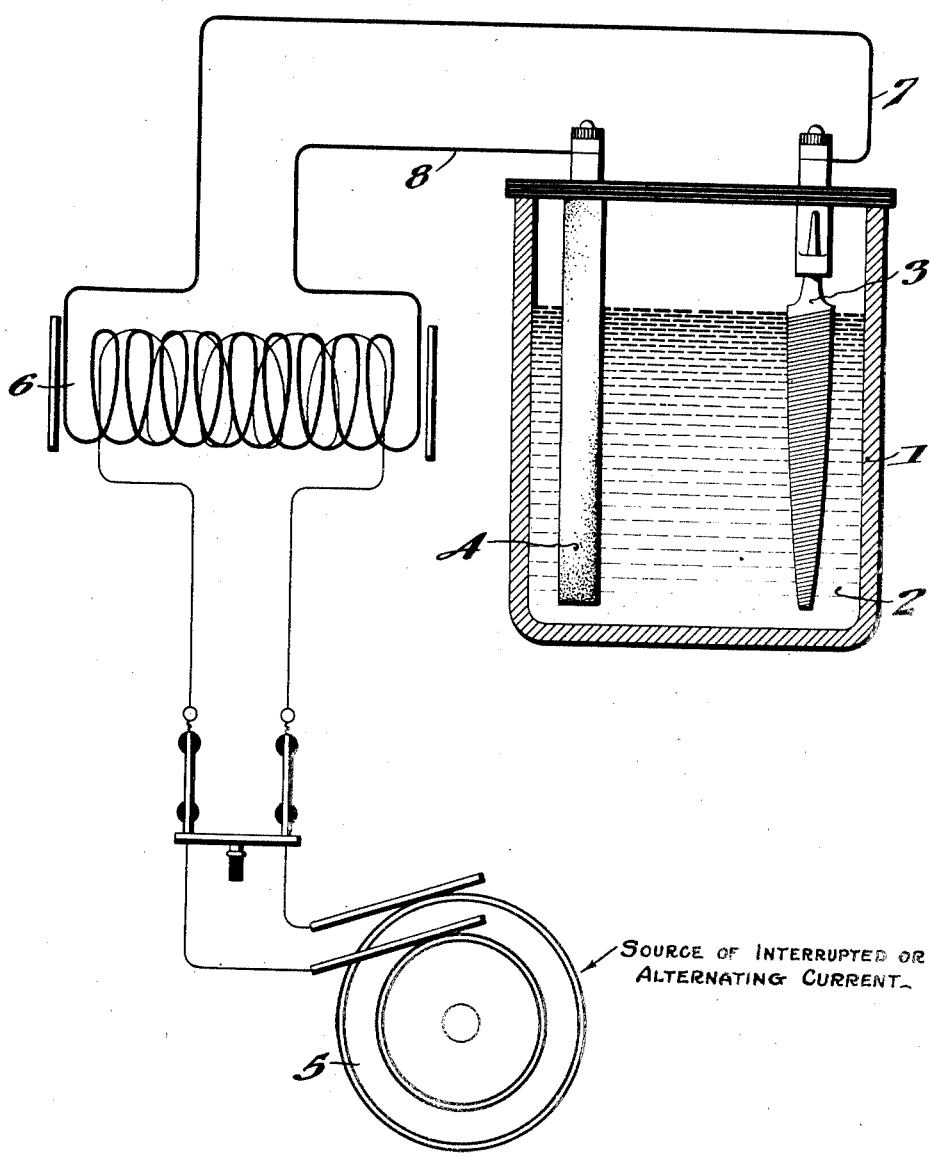

SIDNEY THOMAS JUDD, OF LEWISHAM, LONDON, ENGLAND.

RESHARPENING OF FILES, RASPS, AND THE LIKE.

1,372,170.                Specification of Letters Patent.    Patented Mar. 22, 1921.

Application filed January 26, 1921. Serial No. 440,229.

*To all whom it may concern:*

Be it known that I, SIDNEY THOMAS JUDD, a subject of the King of Great Britain and Ireland, residing at 2 Lethbridge road, Lewisham, London, England, have invented new and useful Improvements in and Relating to the Resharpening of Files, Rasps, and the like, of which the following is a specification.

This invention relates to the improvements in the resharpening of files, rasps and the like and has for its object the provision of means whereby the resharpening is very effectively and expeditiously performed at a low cost.

The invention consists in the employment of a high tension electric current the spark length of which in air is equal to the average length of the files, rasps or the like, treated for a period of time the numerical duration in minutes of which is equal to the number of inches of spark length employed in association with an electrolyte comprising dilute sulfuric and nitric acids so as to effect the resharpening of the files, rasps or the like.

For the purpose of showing the details of electrical connection, attention is called to the accompanying drawing as showing an embodiment thereof. Applicant does not, however, wish to be limited to the particular form shown. In the drawing the numeral 1 represents a vat composed of porcelain or other suitable material. Within this vat is an electrolyte 2 composed of water, sulfuric acid and nitric acid in proportions as hereinafter set out. Within this electrolyte are suspended files 3 and some suitable cathode 4. 5 represents any convenient source of electrical energy and 6 is an induction coil for the purpose of producing a high tension electrical current. The primary winding of this coil is connected with a source of electrical energy, while the secondary winding through the wire 7 is connected to the files and through the wire 8 is connected to the cathode 4. Through the cathode 4 the coil has connection with the electrolyte within the vat.

To carry the invention into effect, the files or the like are first thoroughly cleaned so as to remove all grease, impurities, or other matter, wire brushed, and placed in a vat, which may be an earthenware or porcelain bath, a wooden box suitably water-proofed, or any other suitable vessel. This vat or the like contains ordinary water initially and after the files or the like have been placed therein and an induction coil connected up so that one connection is in contact with the files and the other with the water contained within the vat, the water is rendered a conductor by acidulation in the following way.

Taking the water approximately as 9 parts the following are then added:—

Three quarters of a part or thereabouts, of pure nitric acid and one and one quarter parts or thereabouts of pure sulfuric acid.

The current is then switched on.

If the files being resharpened are all the same length, say 10 inches, then the coil is regulated to give 10 inch spark and the current is kept on for 10 minutes. It has been found by experiment that this gives the best results and therefore is adopted as a definite corresponding or equivalent time for the files to remain in the bath, the figure 10 also being adopted for the length of spark which will correspond with the length of files being treated. This is a very important detail in order to obtain the excellent results achieved.

As a result it will be seen that the following conditions are desirable.

Length of files—10 inches.
Length of spark—10 inches.
Time of treatment—10 minutes.

If a batch of files of different lengths including say, eight inch, ten inch, twelve inch, and fourteen inch files were to be treated then the mean average of eight, ten, twelve and fourteen is taken, viz., eleven inches, and an eleven inch spark is used for eleven minutes.

The files are after treatment removed from the bath, washed, wire-brushed, dipped into or brushed with an aqueous solution of soda or equivalent alkali and allowed to dry. They are then ready for immediate use. If the resharpened files are to be stocked, conventional rust preventing means or treatment are employed.

It is pointed out that one of the features of this invention is that a definite time is obtained for treating a batch of files of the same or of different lengths, it being immaterial whether the files are flat, round, square, three cornered, half round, or any special shape or length the number of files depending upon the size of the vat used.

The action which takes place on the files while in the bath sharpens the points or edges of the teeth and the gaseous bubbles which are given off adhere to the points of the teeth and insulate them from further action which continues uninterruptedly within the cuts of the files thus increasing the depth of the teeth.

I claim:

1. In a method of treating worn files or rasps for sharpening the teeth thereof, comprising the immersion of the files or rasps in a liquid electrolyte and conducting an electric current through said electrolyte and through said files or rasps, the employment of a high tension electric current, the spark length of which in air is substantially equal to the average length of the files or rasps treated, for a period of time, the duration of which in minutes is substantially equal to the length of the spark employed, in inches, substantially as and for the purposes described.

2. In a method of treatment as claimed in claim 1 the employment of a liquid electrolyte composed of nine parts of water, three quarters of a part of pure nitric acid and one and one quarter parts of pure sulfuric acid substantially as, and for the purposes described.

In testimony whereof I have signed my name to this specification in the presence of two subscribing witnesses.

SIDNEY THOMAS JUDD.

Witnesses:
CHARLES J. R. BULLOUGH,
OLIVE WEST.